(12) United States Patent
Nagy et al.

(10) Patent No.: US 6,218,486 B1
(45) Date of Patent: *Apr. 17, 2001

(54) METHOD OF POLYMERIZING VINYL CHLORIDE MONOMER USING AN ORGANOCOBALT (III) CATALYST

(75) Inventors: Sandor Nagy, Grand Island; John Tyrell, Williamsville, both of NY (US)

(73) Assignee: Occidental Chemical Corporation, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,511

(22) Filed: Mar. 7, 1997

(51) Int. Cl.⁷ .................................. C08F 2/16; C08F 4/06
(52) U.S. Cl. .................................. 526/93; 526/94
(58) Field of Search .................... 526/92, 93, 94, 526/344.1, 344.2

(56) References Cited

U.S. PATENT DOCUMENTS 4,694,054   9/1987   Jamewicz ............................. 526/93

FOREIGN PATENT DOCUMENTS

767417   *  2/1957   (GB) .
1136326  *  12/1968  (GB) .
1816764     5/1993   (RU) .

OTHER PUBLICATIONS

M. Clark, Particulate Nature of PVC, 1982, pp. 1 to 10.
PCT International Appl. WO9615158 A1.
A. A. Gridnev, et al. Doki. Akad. Nauk SSSR, v. 267, N. 1, p. 103 (1982).
E. V. Rogova et al.—Polymer Science, Ser B, v. 37, N. 9–10, p. 447 (1995).

* cited by examiner

Primary Examiner—Christopher Henderson
(74) Attorney, Agent, or Firm—Richard D. Fuerle; Anne E. Brookes (57) ABSTRACT

Disclosed is a method of polymerizing vinyl chloride monomer using a catalyst having the general formula

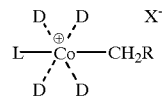

where L is a ligand covalently bonded to the cobalt atom, each D is independently selected from donor ligands, R is hydrogen, hydrocarbon from $C_1$ to $C_{30}$, or hydrohalocarbon from $C_1$ to $C_{30}$, and $X^-$ is an anion. The catalyst is activated by the addition of an acid.

12 Claims, 2 Drawing Sheets

METHOD OF POLYMERIZING VINYL CHLORIDE MONOMER USING AN ORGANOCOBALT (III) CATALYST

BACKGROUND OF THE INVENTION

This invention relates to the use of an organocobalt (III) catalyst to polymerize vinyl chloride monomer. In particular, it relates to the use of an acid activated cationic catalyst having two organic ligands covalently bonded to a cobalt atom and four ligands donating electron pairs to the cobalt atom, where the various ligands can be bridged together.

Commercially, a peroxide initiator is used to produce poly(vinylchloride) (PVC) from vinyl chloride monomer (VCM). Peroxide initiators are difficult to handle because they are unstable and can explode if proper safety precautions are not followed. Since the reaction mixture containing the peroxide initiators must be heated to start the polymerization process, the production of PVC periodically grinds to a halt while reactors are heated to the necessary temperature. In addition, when a peroxide is used it is incorporated, which can destabilize the polymer.

Cationic organocobalt (III) catalysts have been used to polymerize various monomers, including methyl methacrylate (Gridnev A. A., et al.—Dokl. Akad.Nauk SSSR, v.267, N.1, p. 103 (1982)), 1,1,2-trifluoro-1,3-butadiene (Rogova E. V., et al.—Polymer Science, Ser.B, v.37, N.9–10, p.447 (1995)), and styrene Russian Patent SU 1816764 (1993)). However, catalysts used in the addition polymerization of unsaturated monomers tend to be specific to a given monomer. For example, many metallocene catalysts that will readily polymerize ethylene or styrene will not polymerize vinyl chloride.

SUMMARY OF THE INVENTION

We have discovered that certain organocobalt (III) complexes are useful as catalysts for polymerizing VCM. Surprisingly, we have discovered that some of these complexes are very active and convenient to use as polymerization catalysts. Because these catalysts are activated by acids rather than heat, there is no delay in the production of the PVC due to heating the reactor, as there is with peroxide catalysts.

While PVC produced in a suspension process using peroxide catalysts consists of many small particles enclosed in a pericular skin (see *Particulate Nature of PVC* by G. Butters, pages 4,8, and 9; 1982), PVC produced in a suspension process using a catalyst according to this invention is skinless. The absence of this skin is an unexpected phenomenon that is expected to accelerate the removal of unreacted VCM from the particles and the diffusion of plasticizer into the particles.

DESCRIPTION OF THE PREFERRED EMBODIMENTS

The catalysts of this invention have the general formula where L is a ligand covalently bonded to the cobalt atom, D, a donor ligand, is a ligand that can donate a pair of electrons to the cobalt atom, R is hydrogen, hydrocarbon from $C_1$ to $C_{30}$, or hydrohalocarbon from $C_1$ to $C_{30}$, and $X_-$ is an anion. The L ligand is preferably bridged to one, two, or three of the D ligands. Preferred L ligands are alkoxides, phenoxides, or amides from $C_1$ to $C_{14}$ substituted with carbonyl, imine, ether, or amine groups. The D ligands can be the same or different and 2 or 3 of the D ligands can be bridged between each other or to the L ligand. Preferably, at least two of the D ligands donate a pair of electrons to the cobalt atom through a sulfur, nitrogen, or phosphorus atom. Also, the donor ligand D is preferably an amine or an imine and R is preferably hydrogen, methyl, heptyl, or benzyl.

Preferred general formulas are where $L_1$, a monodentate ligand, is —Cl, or R", R"is —OR, —SR, —N(R)$_2$, Cp, or R substituted Cp, Cp is cyclopentadienyl, indenyl, or fluorenyl, $L_2$, a bidentate ligand, is R" substituted with one R' group, R' is ether, amine, thioether, phosphine, carbonyl, or imine, $L_3$, a tridentate ligand, is R"substituted with two R' groups, $D_1$, a monodentate ligand, is an ether, amine, thioether, phosphine, carbonyl, or imine, $D_2$, a bidentate ligand, is $D_1$ substituted with one R' group, $D_3$, a tridentate ligand, is $D_1$ substituted with two R' groups, a is 0 to 4, b is 0 to 2, c is 0 or 1, d is 0 to 3, e is 0 or 1, f is 0 or 1, g is 0 to 2, h is 0 or 1, a+2b +3c =4, d+b2e +3f =3, and g+2h =2. In the preferred catalysts, L is $L_3$ and D is $D_2$. Preferably, $L_1$ is —OCH$_3$ or —N(CH$_3$)$_2$, $L_2$ is tertiary amine or imine, and $D_1$ is primary amine or imine, as those catalysts are easier to make. The R group is preferably alkyl from $C_1$ to $C_6$, aralkyl from $C_1$ to $C_{10}$, aralkyl $C_1$, to $C_{10}$, fluoraralkyl from $C_1$ to $C_{10}$, or chloraralkyl $C_1$, to $C_{10}$, as those compounds are better catalysts, and R is most preferably hydrogen, methyl, heptyl, or benzyl.

Examples of $X^-$ anions include $Br^-$, $Cl^-$, $I^-$, $PF_6^-$, $ClO_4^-$, $BF_4^-$, and $B(Ar)_4^-$, where "Ar" is aromatic from $C_6$ to $C_{10}^-$. The preferred anions are the monovalent anions, chloride, bromide, or iodide as those catalysts are easier to prepare. Examples of monodentate $D_1$ ligands include

Examples of bidentate $D_2$ ligands include

Examples of tridentate $D_3$ ligands include

Examples of bidentate $L_2$ ligands include

Examples of tridentate $L_3$ ligands include

-continued

Preparation of the Catalyst

Procedures described in the prior art can be used to prepare the catalysts of this invention. See, for example, Russian Patent SU 1816764 (1993) and Levitin 1. Ya., Bodnar R. M., Vol'pin M.E.,—Inorganic Syntheses, V. 23, p. 163, (1985).

Polymerization of VCM

VCM can be polymerized in an aqueous suspension, an aqueous emulsion, or in bulk by methods well known in the art. The catalysts of this invention are useful in any of these polymerization processes, but they are especially preferred for use in a suspension or emulsion polymerization process because those are more economical methods of producing PVC.

The catalyst can be used at a VCM/cobalt mole ratio of about 300 to about 15,000; less catalyst is inefficient and more catalyst is unnecessary. The catalyst is preferably used at a VCM/cobalt mole ratio of about 3000 to about 7000.

The catalyst is activated by the addition of an acid that is capable of protonating at least one of the D ligands. About 1 to about 15 equivalents of acid can be used per cobalt atom and preferably about 3 to about 5 equivalents are used for maximum effect. Examples of suitable acids include acetic acid, hydrochloric acid, sulfuric acid, and phosphoric acid; acetic and hydrochloric acids are preferred because they are easier to handle.

The following examples further illustrate this invention. Examples 1 to 3 illustrate preparation of the catalyst.

EXAMPLE 1

Ethyl-[2-[1-[2-aminoethyl) imino]ethyl]-phenolato] (1,2-ethanediamine cobalt (III) bromide, which has the formula was prepared in a one step synthesis from commercially available starting materials according to a literature procedure [Levitin I. Ya., et al.—Inorg. Synth., v. 23, p. 163 (1985). To a stirred solution of 3.8 g (28 mmoles) of o-hydroxyacetophenone in 100 ml of deaerated methanol in a dark nitrogen atmoshphere was added 1,2-ethanediamine (2.4 ml of 70 wt % aqueous solution, 28 mmoles) and 3.3 g (14 mmoles) of cobalt (II) chloride hexahydrate. The flask was cooled in an ice bath and 4.5 ml of 50 % aqueous solution of NaOH was added. After five minutes, 0.25 g of $NaBH_4$ was added in 2 ml of 5 wt % aqueous NaOH, followed by 0.25 ml of 2 wt % solution of palladium (II) chloride in 1M aqueous KCl.1. After 15 minutes the ice bath was removed and 6.8 g of ethyl bromide (65 mmoles) was introduced; then a solution of 0.5 g of $NaBH_4$ in 4 ml of 5 wt % aqueous sodium hydroxide was added over a period of 5 hours. Stirring was continued overnight. The resulting suspension was filtered through a glass filter and the solid residue was extracted with methanol. The filtrate was concentrated to a volume of 35 ml and diluted with 20 ml of water and 10 ml of a saturated solution of sodium bromide was added. The resulting solution was concentrated to a volume of 25 ml. The resulting precipitate was collected by filtration and washed with cold water, a small amount of acetone, and ether; then it was extracted with methylene chloride until the solvent was no longer green. The residue was dried, yielding 0.43 g of orange crystalline catalyst.

EXAMPLE 2

Ethyl-[2-[(2-aminoethyl)imino]pent-3-en-4-olate](1,2-ethanediamine cobalt (III) bromide, which has the formula was prepared according to a literature procedure [Tsarkova, M. S., et al.—Patent SU 1816764, (1993)]. To a stirred solution of 12.3 ml (120 mmoles) of acetylacetone in 430 ml of deaerated methanol in a dark $N_2$ atmosphere was added 1,2-ethanediamine (70 wt % aqueous solution, 120 mmoles) and 14.1 g (60 mmoles) of cobalt (II) chloride hexahydrate. The flask was cooled in an ice bath and 19.3 ml of 50 wt % aqueous solution of NaOH was added. Then 1 ml of 2 wt % solution of palladium (II) chloride in 1M aqueous KCl and 21 g of ethyl bromide (273 mmoles) was introduced. A solution of 3.2 g of $NaBH_4$ (85 mmoles) in 25 ml of 5 wt % aqueous sodium hydroxide was added over a period of 1 hour. The reaction mixture was stirred for an additional hour, filtered, and concentrated to a volume of 100 ml and 20 g of sodium bromide and 100 ml of water were added. The resulting solution was concentrated to a volume of 100 ml and cooled in a refrigerator overnight. The resulting precipitate was collected by filtration and washed with 15 ml of cold water; after drying, the product was extracted with methylene chloride until the solvent was no longer green. The residue was dried, yielding 13.2 g of a red crystalline catalyst.

EXAMPLE 3

Octyl-[2-[(2-aminoethyl)imino]pent-3-en-4-olate](1,2-ethandiamine cobalt (III) bromide, which has the formula was prepared in a manner similar to that of Example 2. To a stirred solution of 3.1 ml (40 mmoles) of acetylacetone in 110 ml of deaerated methanol in a dark nitrogen atmosphere was added 30 mmoles of 1,2-ethanediamine (70% aq. solution) and 3.5 g (29.9 mmoles) of cobalt (II) chloride hexahydrate. The flask was cooled in an ice bath and 4.8 ml of 50 wt % aq. solution of NaOH was added. Then 0.25 ml of 2 wt % solution of palladium (II) chloride in 1M aq. KCl and 11.8 ml (68.2 mmoles) of 1-bromooctane was introduced. A solution of 0.8 g of NaBH$_4$ (21 mmoles) in 6.3 ml of 5 wt % aq. sodium hydroxide solution was added over a period of 2 hours. The reaction mixture was stirred for two additional hours, filtered, and concentrated to a volume of 25 ml and 5 g of NaBr and 25 ml of water were added. The resulting solution was concentrated to a volume of 25 ml and cooled overnight in a refrigerator. The resulting precipitate was collected and washed with 10 ml of cold water. After drying, the product was dissolved in 20 ml of methylene chloride, the solution was concentrated to half volume, and the solids were isolated from the mother solution yielding 0.7 g of red product.

EXAMPLE 4

Figure 1:
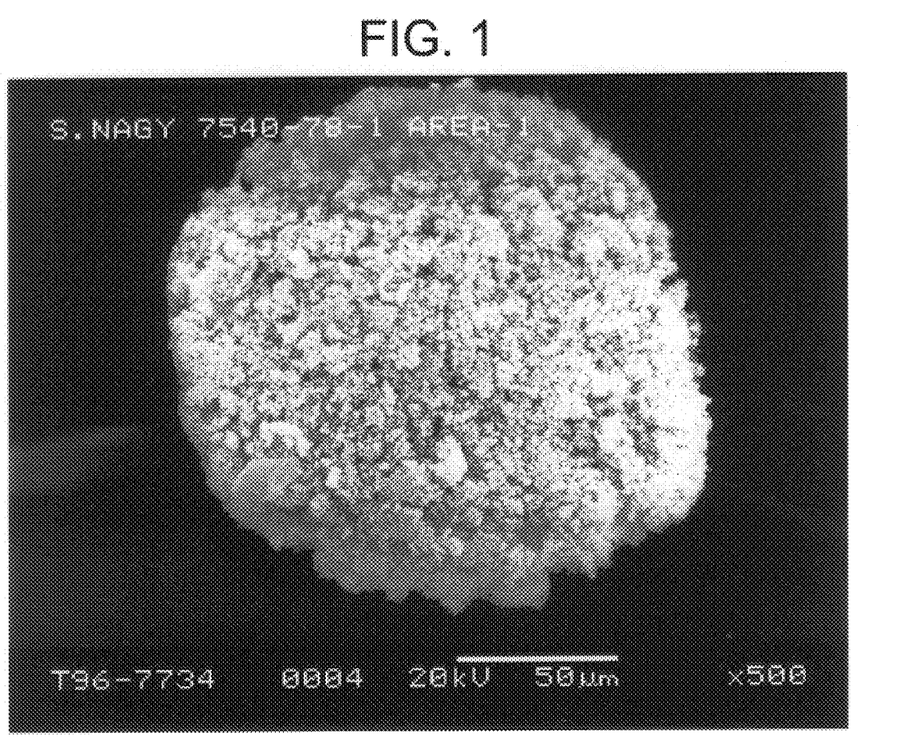
FIGS. 1 and 2 are scanning electron micrographs (SEM) of particles of PVC made in a suspension polymerization process using a catalyst according to this invention. The micrograph are further described in Example 4.
Figure 2:
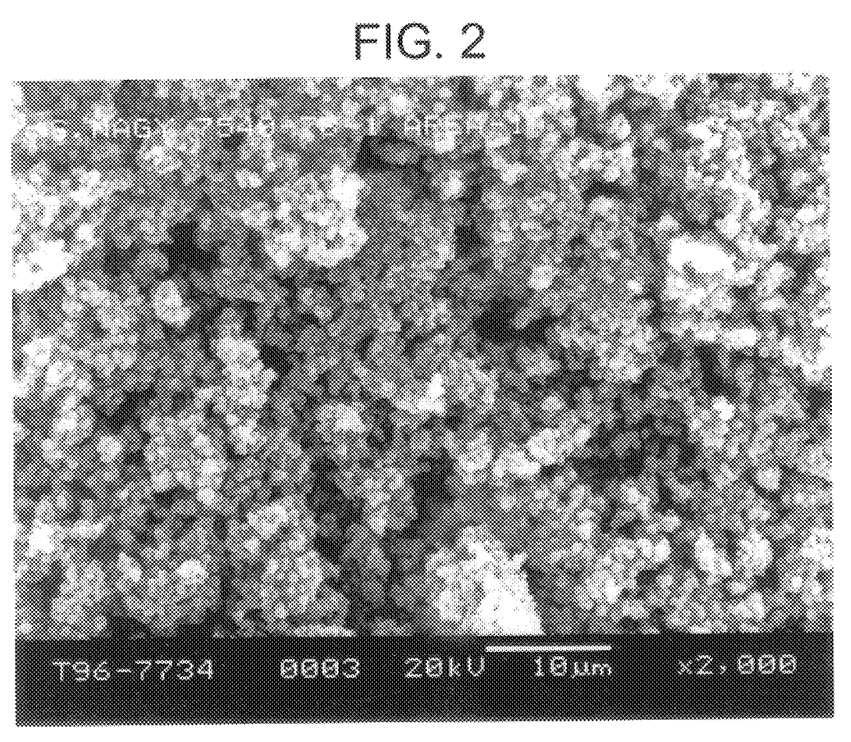

The catalyst from Example 1 was used to polymerize VCM by a suspension process. In a pressure tube, 0.1 g of the catalyst and 0.03 g hydroxylpropyl methyl cellulose, sold by Dow as "Methocel", were dissolved in 20 ml water and the water was deaerated. Approximately 10 ml of VCM was added at 0° C., forming a stirred suspension to which was added 0.3 ml of conc. HCl. The reaction was continued for 1 hour at room temperature. The yield was 3.2 g of white Pvc. The Mw was 157,700, the Mn was 46,700, and the polydispersity was 3.4, as determined by GPC. The product PVC was examined by SEM and was shown to consist of 100 to 200 micron size particles without periculer skin, as shown in FIG. 1 (×500) and FIG. 2 (×2000). Unexpectedly, these particles seemed to be very porous. They were made of 0.5 micron size smaller globules fused together.

EXAMPLE 5

The suspension polymerization procedure of Example 4 was repeated using 0.06 g of the catalyst from Example 2 and 0.018 "Methocel". The yield after 15 hours was 1.35 g of PVC. GPC analysis of a tetrahydrofuran solution of a sample of the polymer gave an Mw of 115,800, an Mn of 30,200, and a polydispersity of 3.8. Inductively Coupled Plasma (ICP) analysis indicated 120 ppm of residual cobalt in the polymer.

EXAMPLE 6

The suspension polymerization procedure of Example 4 was repeated using 0.06 g of the catalyst from Example 3 and 0.02 g Methocel. The yield after 15 hours was 0.41 g PVC.

EXAMPLE 7

This example illustrates the emulsion polymerization of VCM using the catalyst from Example 2. To 15 ml of deaerated water in a pressure tube was dissolved 0.025 g of catalyst from Example 2 and 0.3 g of the sodium salt of dodecyl sulfate. After evacuation, 7 ml of VCM was condensed into the tube at 0° C. and, with intensive stirring, 0.1 ml of conc. HCl were added to the reaction mixture. After 15 hours of stirring, the reaction mixture was allowed to dry; the yield of PVC was 3.2 g. GPC analysis gave an Mn of 42,000 and an Mw of 145,000.

EXAMPLE 8

This Example illustrates the use of acetic acid to activate the cobalt complex. To 15 ml of deaerated water in a pressure tube was dissolved 0.05 g of catalyst from Example 2, 0.3 g of the sodium salt of dodecyl sulfate, and 0.02 g of sodium acetate. After evacuation, 7 ml of vinyl chloride was condensed into the tube at 0° C. and, with intensive stirring, 0.1 ml of glacial acetic acid were added. After 15 hours at room temperature, 4.6 g of PVC were produced.

We claim:

1. A method of polymerizing vinyl chloride monomer consisting essentially of contacting an aqueous suspension or emulsion of a monomer consisting essentially of vinyl chloride monomer under polymerizing conditions with a catalyst having the general formula 2. A method of polymerizing vinyl chloride monomer consisting essentially of
(A) contacting an aqueous suspension or emulsion of a monomer consisting essentially of vinyl chloride under polymerizing conditions with a catalyst having the general formula where $L_1$ is —Cl or R", R" is —OR, —SR, —N(R)$_2$, Cp, or R substituted Cp, R is hydrogen, hydrocarbon from $C_1$ to $C_{30}$, or hydrohalocarbon $C_1$ to $C_{30}$, Cp is cyclopentadienyl, indenyl, or fluorenyl, $L_2$ is R"substituted with one R' group, R' is ether, amine, thioether, phosphine, carbonyl, or imine, $L_3$ is R" substituted with two R' groups, $D_1$, is an ether, amine, thioether, phosphine, carbonyl, or imine, $D_2$ is $D_1$ substituted with one R' group, $D_3$ is $D_1$ substituted with two R' groups, a is 0 to 4, b is 0 to 2, c is 0 or 1, d is 0 to 3, e is 0 or 1, f is 0 or 1, g is 0 to 2, h is 0 or 1, a+2b +3c =4, d+2e +3f =3, and g+2h =2; and (B) contacting said catalyst with about 1 to about 15 equivalents per equivalent of cobalt of an acid that can protonate the complex.

3. A method according to claim 2 wherein said catalyst has the formula

4. A method according to claim 2 wherein said catalyst has the formula

5. A method according to claim 2 wherein said catalyst has the formula

6. A method according to claim 2 wherein $L_1$ is —OCH$_3$ or —N(CH$_3$)$_2$.

7. A method according to claim 2 wherein $L_2$ is selected from the group consisting of

8. A method according to claim 2 wherein $L_3$ is selected from the group consisting of

9. A method according to claim 2 wherein $D^1$, is selected from the group consisting of

10. A method according to claim 2 wherein $D_2$ is selected from the group consisting of

11. A method according to claim 2 wherein $D_3$ is selected from the group consisting of

12. A method of polymerizing vinyl chloride monomer in an aqueous suspension comprising (A) contacting an aqueous suspension of a monomer consisting essentially of vinyl chloride under polymerizing conditions with a catalyst having the general formula where R is hydrogen, methyl, or heptyl, L is an alkoxide, phenoxide, or amide from $C_1$ to $C_{14}$ substituted with carbonyl, imine, ether, or amine, D is a S, N, or P containing donor ligand, L is bridged to one, two, or three D ligands, and $X^-$ is chloride, bromide, or iodide; and (B) contacting said catalyst with about 1 to about 15 equivalents per equivalent of cobalt of acetic acid or hydrochloric acid.

* * * * *